(12) United States Patent
Dumouchel

(10) Patent No.: US 6,780,500 B2
(45) Date of Patent: Aug. 24, 2004

(54) PART MADE OF RECYCLED THERMOPLASTIC MATERIAL, A CORRESPONDING METHOD OF MANUFACTURE, AND A PALLET COMPRISING AT LEAST ONE BAR OF THIS TYPE

(75) Inventor: Catherine Dumouchel, 9 Rue Edouard Vallerand, Saint-Maur (FR), 94100

(73) Assignees: Catherine Dumouchel, Saint-Maur (FR); Cybele Environnement, Lens (FR)

( * ) Notice: Subject to any disclaimer, the term of this patent is extended or adjusted under 35 U.S.C. 154(b) by 106 days.

(21) Appl. No.: 09/987,594

(22) Filed: Nov. 15, 2001

(65) Prior Publication Data

US 2002/0058134 A1 May 16, 2002

(30) Foreign Application Priority Data

Nov. 16, 2000 (FR) .......................................... 00 14783

(51) Int. Cl.$^7$ ............................................... B32B 18/00
(52) U.S. Cl. ...................... 428/325; 428/323; 428/332; 428/372
(58) Field of Search ................................ 428/323, 325, 428/332, 364, 363, 324, 372, 297.4; 264/523, 537, 540

(56) References Cited

U.S. PATENT DOCUMENTS

| 4,778,842 A | * | 10/1988 | Taniguchi et al. .......... 524/504 |
| 5,405,567 A | | 4/1995 | Needham et al. |
| 5,527,585 A | | 6/1996 | Needham et al. |
| 5,951,940 A | * | 9/1999 | Nosker et al. .............. 264/523 |
| 5,965,655 A | * | 10/1999 | Mordecai et al. ........... 524/451 |

FOREIGN PATENT DOCUMENTS

| EP | 0 666 285 A1 | 8/1995 |
| WO | WO 91/08263 | 6/1991 |

\* cited by examiner

Primary Examiner—Merrick Dixon
(74) Attorney, Agent, or Firm—Young & Thompson

(57) ABSTRACT

The present invention provides a part made of a thermoplastic material containing:
  recycled polyethylene terephthalate;
  recycled high density polyethylene;
  a compatibility agent; and
  a reinforcing filler. The invention also provides a method of manufacturing such a part in the form of a bar, and a pallet incorporating at least one bar of this type.

5 Claims, 2 Drawing Sheets

FIG_1

PART MADE OF RECYCLED THERMOPLASTIC MATERIAL, A CORRESPONDING METHOD OF MANUFACTURE, AND A PALLET COMPRISING AT LEAST ONE BAR OF THIS TYPE

The present invention relates to products made out of recycled thermoplastic material, and to a method of manufacturing them.

BACKGROUND OF THE INVENTION

With ecology playing an increasing part in present-day society, industry and consumers are having to take control of the impact of their activity and their behavior on the environment in order to avoid polluting and degrading it.

One of the main problems associated with this preoccupation lies in the increasing amount of thermoplastic material used in making consumer products, and consequently lies in eliminating waste containing such materials. These materials are not rapidly biodegradable so merely dumping such waste is not a solution that is satisfactory from an ecological point of view.

To eliminate such waste, incineration has been resorted to, which achieves physical elimination of the waste and avoids the need to store it. However incineration produces flue gases that heat and pollute the atmosphere.

Another solution to the problem is recycling the products. The suitability of thermoplastic materials for recycling depends in particular on the physico-chemical characteristics thereof. Thermoplastic materials that are suitable for recycling are generally ground up and cleaned for use in the manufacturing cycle of a wide variety of novel products by being incorporated in the material from which such products are made. Thermoplastic materials that are not very suitable for recycling are generally merely ground up so as to be used as filler or packing material, or they are possibly incorporated in materials that are to constitute products of mediocre quality presenting poor mechanical characteristics.

New polyethylene terephthlate is a material that is frequently used to manufacture mass-produced products such as bottles or common consumer articles. Recycled polyethylene terephthlate, in particular when it comes from household waste, is often heterogeneous in nature having physico-chemical characteristics of relatively poor level, thereby restricting its use to manufacturing products that are thin and of mediocre quality, and that are made out of materials incorporating only a small quantity thereof. Given the volumes of products made out of new polyethylene terephthlate and the difficulty in recycling this material, recycling all of the polyethylene terephthlate that is produced is not a practical possibility at present. This is amplified by the fact that recycled polyethylene terephthlate, and indeed ordinary quality new polyethylene terephthlate, is unsuitable for use in making bulky parts that are solid. As a result the quantity of polyethylene terephthlate that can be recycled in products is limited.

OBJECTS AND SUMMARY OF THE INVENTION

It would therefore be advantageous to be able to obtain said bulky parts that incorporate recycled polyethylene terephthalate while also having good mechanical characteristics.

To this end, the invention provides a thermoplastic material part wherein the material comprises:

recycled polyethylene terephthalate;
recycled high density polyethylene;
a compatibility agent; and
a reinforcing filler, the material advantageously comprising, by weight:
approximately 49% to 63.5% and preferably 55% of polyethylene terephthalate;
approximately 27% to 36% and preferably 33% of high density polyethylene;
approximately 4% to 6% and preferably 5% compatibility agent; and
approximately 5% to 10% and preferably 7% of reinforcing filler.

This provides a part which can be solid and bulky in structure. The part also presents mechanical characteristics which are satisfactory, and in the preferred composition come close to those of wood, with this applying in particular to breaking strength, thereby enabling the part to be assembled in similar ways to wood.

The invention also provides a method of fabricating a part of the above type in the form of a bar, the method comprising the steps of:

drying flakes of recycled polyethylene terephthalate;
introducing said dried flakes of polyethylene terephthalate, flakes of recycled high density polyethylene, the compatibility agent, and the reinforcing filler into an extruder in order to obtain a paste mixture; and
introducing the paste mixture into a mold placed directly at the outlet from the extruder.

Drying the polyethylene terephthalate flakes serves to avoid hydrolysis of the polyethylene terephthalate during extrusion. It has been found that such hydrolysis gives rise directly to a reduction in the impact strength of polyethylene terephthalate.

Advantageously, the method includes a subsequent step of cooling the mixture contained in the mold.

By cooling the mixture contained in the mold immediately after the paste mixture has penetrated into the mold makes it possible to obtain a bar which has a surface layer that is in an amorphous phase which is more flexible. This improves the mechanical properties of the material, and in particular its impact strength.

The invention also provides a goods pallet comprising parallel support elements having end portions that are fixed by assembly means to cross-connection elements resting on brackets, with at least one of said elements being constituted by a beam presenting one of the above-specified characteristics.

A pallet constructed in this way can be made by assembling together various elements, and it presents properties of the same order as those of conventional pallets, and in particular wooden pallets, or indeed properties that are better than those of pallets made out of injected thermoplastic material of ordinary type.

Advantageously, at least one of the cross elements is constituted by a beam of channel section having a top flange on which the support elements are fixed, and a web and a bottom flange cut out by at least one notch to form on either side thereof two spaced-apart brackets integral with the cross element. The channel section of the beam provides good distribution of the weight supported by the pallet, thereby increasing the strength of the pallet. Furthermore, by using such a beam, the various portions of a conventional assembly are formed integrally, thus making it possible to reduce the number of parts and to simplify manufacture of the pallet.

In a particular embodiment, the pallet includes at least one stiffener element extending parallel to the support element and at a distance therefrom between two opposite brackets, the stiffener element being formed by a plank-shaped beam, the bottom surface of said beam being grooved and the beam having at least one chamfer formed on at least one of its top longitudinal edges. This makes for a pallet that is particularly strong. This also makes it possible firstly to lighten the pallet and secondly to reduce the risk of an impact between the stiffener element and the ends of lifting tines.

BRIEF DESCRIPTION OF THE DRAWINGS

Other characteristics and advantages of the invention will appear on reading the following description of a particular, non-limiting embodiment of the invention.

Reference is made to the accompanying drawings, in which.

MORE DETAILED DESCRIPTION

Figure 1:
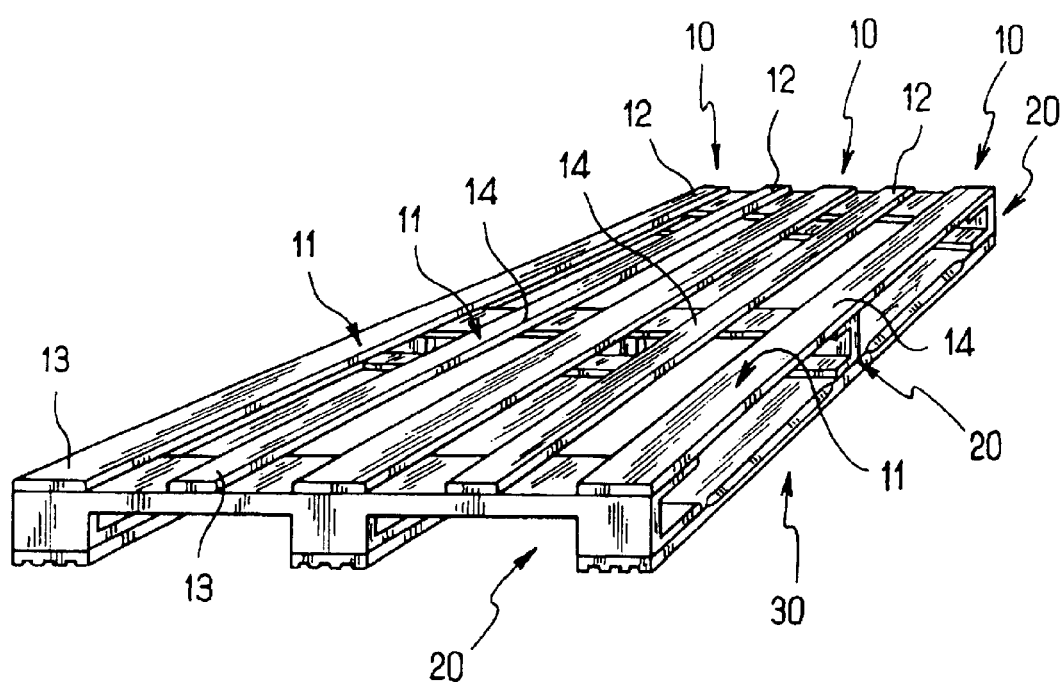
FIG. 1 is a perspective view of a pallet of the invention.
Figure 2:
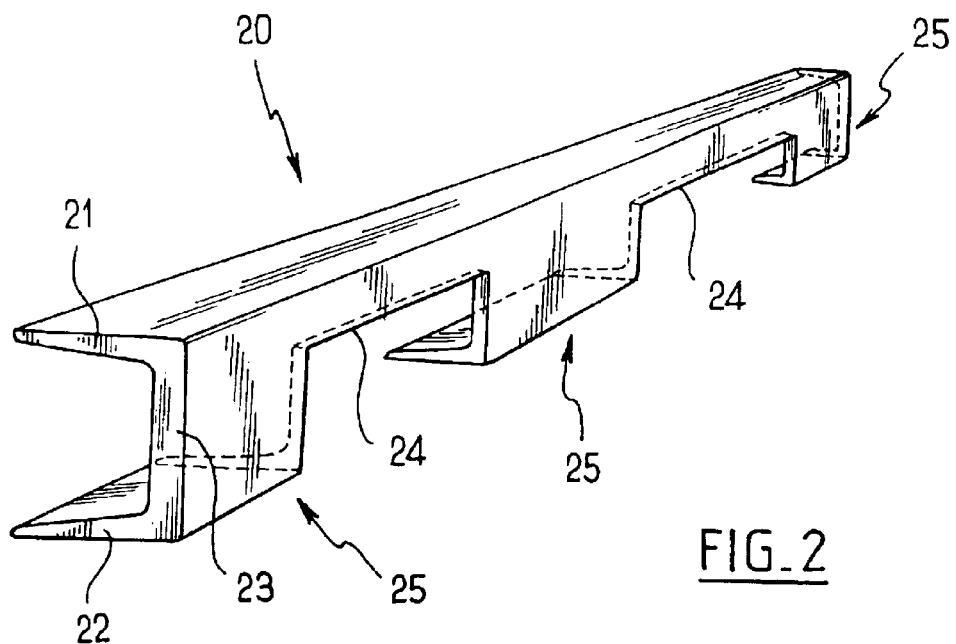
FIG. 2 is a perspective view of a first type of beam in accordance with the invention.
Figure 3:
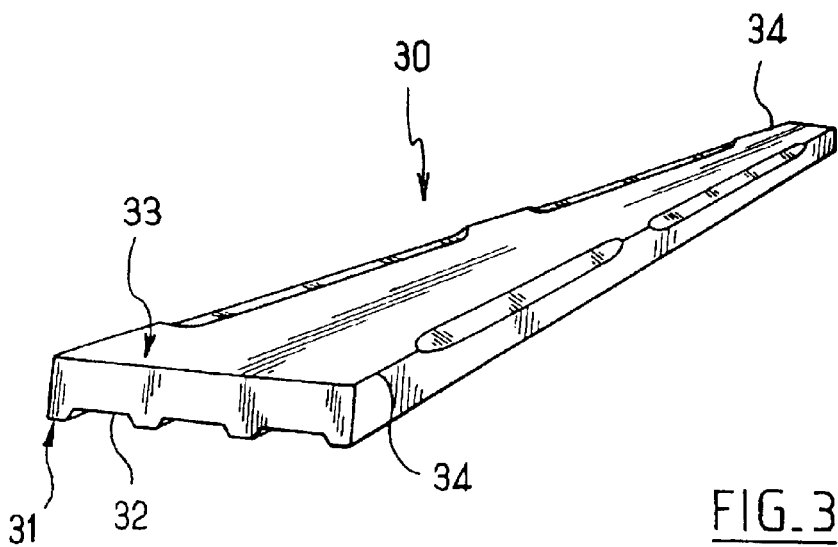
FIG. 3 is a perspective view of a second type of beam in accordance with the invention.

With reference to the figures, the bars in accordance with the invention and given overall references 10, 20, and 30 are made from a thermoplastic material which comprises, by weight, substantially:

- 55% recycled polyethylene terephthalate;
- 33% recycled high density polyethylene;
- 5% compatibility agent; and
- 7% reinforcing filler.

The composition of the thermoplastic material can vary, but the proportions by weight of the various components preferably lie substantially within the following ranges:

- 49% to 63.5% for the polyethylene terephthalate;
- 27% to 36% for the high density polyethylene;
- 4% to 6% for the compatibility agent; and
- 5% to 10% for the reinforcing filler.

Adding high density polyethylene makes it possible to obtain a material that is more amorphous than if polyethylene terephthalate were used on its own (since it is highly crystalline). This improves the mechanical strength of the resulting material.

The compatibility agent is referenced LOTADER AX8900 from Elf Atochem, and it is used for homogenizing the mixture of recycled polyethylene terephthalate and recycled high density polyethylene. Naturally, other compatibility agents having comparable properties could also be used.

The reinforcing filler can be constituted by microbeads of glass such as those produced under the reference 050-20-215 by Sovitec.

The reinforcing filler used can also be made of glass fibers such as those produced under the reference 3540 by PPG. These fibers are 3 millimeters (mm) long and they improve Young's modulus and impact strength.

The reinforcing filler can also be made of glass flakes of the type produced under the reference MICROGLAS by NGF Europe. These flakes make it possible to increase Young's modulus and to increase elongation, thereby also increasing impact strength. Furthermore, the use of glass flakes serves to limit the increase in the viscosity of the mixture due to introducing said flakes therein as compared with introducing fibers. It seems likely that the flakes have an influence firstly on crystallinity and secondly on shrinkage, thereby limiting the appearance of microcracks.

Other reinforcing fillers can be used on their own or in combination. A mixture of glass microbeads and/or glass fibers and/or glass flakes can thus be used.

Naturally, other types of filler can be added to the mixture. Such fillers can include an emulsifier such as zinc carbonate. This makes it possible to create bubbles in the material, thereby reducing the mass of bars made out of said material. Pigments can also be added in order to color the material.

The bars 10, 20, and 30 are made by extrusion molding or by extrusion-intrusion.

The recycled polyethylene terephthalate and the recycled high density polyethylene used are preferably in the form of flakes obtained by grinding polyethylene terephthalate waste and high density polyethylene waste and by washing the resulting flakes. It would also be possible to use granules of such material but that would require additional operations (mixing flakes of each of the materials with fillers, extruding the mixtures, cooling, and then grinding into granules).

The polyethylene terephthalate flakes are initially dried, e.g. in a desiccator, so as to prevent any hydrolysis occurring of the polyethylene terephthalate during subsequent extrusion thereof. The high density polyethylene can also be dried.

The flakes of polyethylene terephthalate and of high density polyethylene, the compatibility agent, and the reinforcing fillers are then mixed together and introduced into the feed hopper of an extruder. It is important to ensure that the flakes descend in regular manner inside the hopper.

In this example, the temperature of the heating body of the extruder is about 250° C. at the hopper end and about 275° C. at the outlet from the extruder. In order to ensure that the various components of the thermoplastic material are properly mixed together, the transit time of the material in the extruder preferably lies in the range 1 minute to a few minutes. The transit time of the material through the extruder is determined in particular by the length of the extruder screw, its pitch, and its speed of rotation.

On leaving the extruder, a paste mixture is obtained which is introduced directly into a mold whose shape corresponds to the beam which is to be made (the extruder opens out directly into the mold through an orifice formed in its wall). It will be observed that if the inside shape of the mold is complex, it might be necessary to provide a plurality of orifices for injecting the material. The pressure for injecting the material into the mold is obtained by the thrust force exerted on the mixture by the extruder screw. When an emulsifier is added to the mixture, a portion of the injection pressure is provided by emulsification. Under such circumstances, the transit time of the material in the extruder is preferably determined in such a manner that emulsification takes place inside the extruder and not inside the mold (since if emulsification occurs inside the mold, then it is more difficult to determine the quantity of material that needs to be introduced into the mold).

Once the mold has been filled, it is plunged into a bath of cold water, e.g. at a temperature equal to or lower than 20° C. This makes it possible to obtain a beam which presents a relatively thick surface layer in an amorphous phase which is relatively flexible and presents relatively good impact strength. Other methods of cooling could naturally be used, and in particular the parts themselves could be plunged into a bath, or the parts or the molds containing them could be maintained in a stream of cold gas.

The pallet of the invention can be made out of any thermoplastic material by assembling together the various elements which constitute the pallet. The pallet described herein is made out of the above-specified thermoplastic material.

The pallet comprises support elements 10 in the form of planks having rough top surfaces 11. The support elements 10 are fixed via their opposite ends 12, 13 and their middle portions 14 to cross-connection beams 20.

The cross-connection beams 20 are of channel section, each presenting a top flange 21 and a bottom flange 22 interconnected by a web 23. The support elements 10 are fixed to the top flange 21.

Two spaced-apart recesses 24 cut out both in the bottom flange 22 and in the web 23 serve to provide passages for the tines of a conventional type of forklift truck. Each cross-connection bar thus constitutes three brackets given overall references 25 and interconnected by the top flange 21. It should be observed at this point that each recess 24 is made in a bottom portion of the web 23 in such a manner that the remaining portion of the web 23 extends along the top of the recess between the brackets. Other recess configurations are possible.

The facing portions of the bottom flanges 22 belonging to the three cross-connection beams are interconnected by three stiffener elements 30 which extend parallel to the support elements 10. The stiffener elements 30 are in the form of planks each comprising a bottom surface 31 having longitudinal grooves 32 and a top surface 33 to which the bottom flanges 22 of the cross-connection parts 20 are fixed. The top longitudinal edges 34 of the stiffener elements 30 are chamfered. The ends of the tines of forklift trucks are generally chamfered underneath so that by cooperating with these chamfer portions, the chamfers form ramps that guide the ends of the tines over the elements 30. The risk of impact between the elements 30 and the tines is thus reduced. This also serves to make the stiffener elements lighter in weight.

The various elements constituting the pallet are assembled together by screws, nails, adhesive, heat-sealing, or a combination of such means. It will be observed that a pallet of the invention is particularly suitable for being assembled together by nailing.

Naturally, the invention is not limited to the embodiment described and variant embodiments can be provided without going beyond the ambit of the invention as defined by the claims.

In particular, other applications can be envisaged for parts made in accordance with the invention.

What is claimed is:

1. A part made of thermoplastic material, wherein the thermoplastic material substantially comprises, by weight:

49% to 63.5% polyethylene terephthalate;

27% to 36% high density polyethylene;

4% to 6% compatibility agent; and

5% to 10% reinforcing filler.

2. A part according to claim 1, wherein the thermoplastic material substantially comprises, by weight:

55% polyethylene terephthalate;

33% high density polyethylene;

5% compatibility agent; and

7% reinforcing filler.

3. A part according to claim 1, wherein the reinforcing filler comprises glass flakes.

4. A part according to claim 1, wherein the reinforcing filler comprises glass fibers.

5. A part according to claim 1, wherein the reinforcing filler comprises glass microbeads.

* * * * *